United States Patent
Stuefe

(10) Patent No.: US 7,386,533 B2
(45) Date of Patent: Jun. 10, 2008

(54) TRANSFERRING DATA IN A DIVERSE FILE SYSTEM LANDSCAPE

(75) Inventor: Thomas Stuefe, Gaiberg (DE)

(73) Assignee: SAP Aktiengesellschaft, Walldorf (DE)

( * ) Notice: Subject to any disclaimer, the term of this patent is extended or adjusted under 35 U.S.C. 154(b) by 373 days.

(21) Appl. No.: 11/112,242

(22) Filed: Apr. 21, 2005

(65) Prior Publication Data

US 2006/0242165 A1    Oct. 26, 2006

(51) Int. Cl.
*G06F 17/30* (2006.01)
*G06F 15/16* (2006.01)

(52) U.S. Cl. .............................. 707/1; 707/10; 707/100
(58) Field of Classification Search .................... 707/1, 707/10, 100
See application file for complete search history.

(56) References Cited

U.S. PATENT DOCUMENTS 6,351,772 B1* 2/2002 Murphy et al. ............. 709/227
6,674,767 B1* 1/2004 Kadyk et al. ............... 370/466
2003/0158836 A1* 8/2003 Venkatesh et al. ............ 707/1

OTHER PUBLICATIONS

Kespret, Istok, "PKZIP, LHARC & Co.—Using Data Compression Utilities", Abacus, 1995, p. 1-29, 97-111.*

* cited by examiner

*Primary Examiner*—Tony Mahmoudi
(74) *Attorney, Agent, or Firm*—Fish & Richardson P.C.

(57) ABSTRACT

Methods and apparatus, including computer program products, relating to transferring data in a diverse file system landscape. In one general aspect, a computer program product can cause a data processor to extract a first one or more file system objects from a self-extracting program, where the first file system objects include file system objects converted from a first type of file system object of a first file system to a second type of file system object of a second file system; and convert the first file system objects to file system objects in the first file system. The second file system can store file system objects of the second type and cannot store file system objects of the first type. The file systems can be the library and root file systems of IBM's iSeries computing system, and the self-extracting program can initiate execution of an Integrated Language Environment program.

18 Claims, 2 Drawing Sheets

TRANSFERRING DATA IN A DIVERSE FILE SYSTEM LANDSCAPE

BACKGROUND

The present invention relates to transferring data in a diverse file system landscape.

Many companies and institutions support diverse computing system landscapes. For example, in large businesses, legacy computing systems and legacy software can co-exist with modern computing systems and modern software. As another example, some educational institutions support computing labs with International Business Machines-compatible personal computers, Apple-compatible personal computers, and UNIX-based computers. Differences across a diverse computing system landscape can include, for example, differences in operating systems, network protocols, and file systems.

Some computing systems integrate aspects of different computing systems into a single computing system. For example, International Business Machines, of Armonk, N.Y.; ("IBM") has developed a series of computing systems known as the iSeries (also referred to as the Application System/400 ("AS/400")—the name given to the iSeries computing systems before being re-branded to the iSeries), which supports a file system known as the Integrated File System ("IFS"). The iSeries' IFS integrates different file systems, such as the library file system, which was traditionally used by AS/400 series computing systems, and a file system referred to as the root file system, which is similar to an Operating System/2 ("OS/2") file system that was developed by IBM.

Differences among different computing system aspects can result in peculiarities when they are integrated. One of the peculiarities of the different file systems in the iSeries is that Integrated Language Environment ("ILE") programs written in the library file system cannot be transferred, in their native format, into or outside of a library file system that is part of an IFS.

However, integration of different computing systems aspects can be advantageous. For example, by integrating the library file system and the root file system, iSeries computers can run both legacy ILE programs written in the library file system and modern Advanced Interactive eXecutive ("AIX"; AIX is a UNIX-based operating system) programs that can be run from the root file system.

SUMMARY OF THE INVENTION

The present invention provides methods and apparatus, including computer program products, that implement techniques relating to self-extracting programs in a diverse file system landscape.

In one general aspect, the techniques feature a method that includes generating a self-extracting program including converting one or more first file system objects of a first type to generate one or more second file system objects of a second type; and generating a self-extracting program operable to run from a second file system, where the second file system can store file system objects of the second type but cannot store file system objects of the first type, and the self-extracting program includes the one or more second file system objects. In that method, the self-extracting program can run from the second file system, extract the one or more second file system objects included in the self-extracting program, convert the extracted one or more second file system objects to one or more third file system objects of the first type, and store the one or more third file system objects in a first file system that can store file system objects of the first type.

The method can be implemented to include one or more of the following advantageous features. The method can further include executing the self-extracting program from the second file system to generate the third file system objects in the first file system. The self-extracting program can be generated on a first computing system; each of the first computing system and a second computing system can include the first and second file systems; and the method can further include the self-extracting program executing on the second computing system.

A first program can include the first and third one or more file system objects and the self-extracting program can cause the first program to execute. The first one or more file system objects can include a compressed program. The second file system objects can include a stream file generated from an Integrated Language Environment executable program that had been compressed into a save file in a library file system and copied into a stream file on the second file system. The second file system objects can further include a generic loader program that can run from the second file system. The first file system can be the library file system; and the second file system can be an iSeries Integrated File System file system that can store stream files. The second file system can be an iSeries Integrated File System root file system.

File system objects of the first can be library objects and file system objects of the second type can be IFS root file system files. File system objects of the first type can include ILE program objects, file system objects of the second type can include IFS stream files, and the method can further include generating a save file from an ILE program file and generating the second file system objects from the save file, where the second file system objects are a stream file.

Generating a self-extracting program can include linking the second file system objects with a loader program to generate the self-extracting program, where the loader program can run from the second file system. The loader program can be a generic loader program and generating the self-extracting program can further include setting parameters of the generic loader program. The first file system objects can include a same program as the third file system objects.

In another aspect, the techniques can be realized as a computer program product, tangibly embodied in an information carrier, that is operable to cause data processing apparatus to extract a first file system object from a self-extracting program, where the first file system object includes a second one or more file system objects converted from a first type of file system objects of a first file system to a second type of file system objects of a second file system; and convert the first file system objects to a third one or more file system objects in the first file system. In that product, the second file system can store file system objects of the second type and cannot store file system objects of the first type.

The computer program product can be implemented to include one or more of the following advantageous features. A first program can include the second and third one or more file system objects and the computer program product can further cause the data processing apparatus to initiate execution of the first program, where the first program executes from the first file system. A first program can include the third one or more file system objects. Converting the first file system objects can include generating one or more compressed files on the first file system from the converted file system object, and generating the third one or more objects from the compressed files.

In another aspect the techniques can be realized as a loader that is configured to perform tasks including extracting a first one or more file system objects from a self-extracting program, where the first file system objects include a second one or more file system objects converted from a first type of file system objects of a first file system to a second type of file system objects of a second file system; and converting the first file system objects to a third one or more file system objects in the first file system. In that loader, the second file system can store file system objects of the second type and cannot store files of the first type.

The loader can be implemented to include one or more of the following advantageous features. A first program can include the second and third one or more file system objects and the loader can be further configured to initiate execution of the first program, where the first program executes from the first file system. A first program can include the third one or more file system objects, and converting the first file system objects can include generating one or more compressed files on the first file system from the first file system objects, and generating the third one or more objects from the compressed files.

The techniques can be implemented to realize one or more of the following advantages. Self-extracting programs can be used to run ILE programs directly from an iSeries computing system, through the Integrated File System, without having to manually restore the ILE programs. The self-extracting program can include a generic loader program and a copy of the ILE program. Because a generic loader can be used, specific coding for each ILE program that is a payload of the self-extracting program need not be generated. For example, a same generic loader can be used for two different ILE programs, and only a few parameters need be set. The self-extracting program can automatically call an extracted program; thus, users need not be familiar with the peculiarities of a computing system supporting multiple file systems to run or install a program written for a file system that has limitations imposed on it for transferring files. For example, a user need not know the restrictions of the library file system of the IFS, or the commands necessary for transferring files to the library file system. Because programs can be run with little or no familiarity, distribution of ILE programs is greatly facilitated.

Because many ILE programs exist, many of those are maintained, and distribution of ILE programs to the iSeries can be facilitated, many application developers need not feel pressured to port applications to other file systems. For example, old ILE programs need not be ported to AIX in order to be used from the IFS root file system. The underlying tasks being performed and the transition from execution of the initial self-extracting program to a library file system-based program that results in running an ILE program can be masked such that a simplified user experience is provided. The self-extracting program can check for copies of ILE programs in the library file system such that a program need not be copied to the library system each time the program is run, and such that a user's experience of running the program is further masked and thereby simplified.

Because a self-extracting program can exist in the IFS, restrictions related to transportation and storage of library file system objects need not inhibit distribution of software. For example, if a chain of distribution relies on the Microsoft Windows NT platform for generation of master copies of compact disks and accessibility of online software updates, and the online updates are stored on Windows NT servers, the tools and storage of software need not be specially adapted to library file system objects. Library file system objects can be converted to stream files and stored as part of a self-extracting executable that is formatted for use in the IFS root file system, under which the files can be manipulated on the Microsoft Windows NT platform (as opposed to requiring special tools and storage space for library file system objects). Thus, the self-extracting executables can be helpful in a generic distribution process that relies on a generic platform for various software intended for various platforms. For example, a Microsoft Windows NT distribution process that is designed for distribution of Linux, UNIX, and Microsoft Windows software.

One implementation of the invention can provide all of the above advantages.

Details of one or more implementations of the invention are set forth in the accompanying drawings and in the description below. Further features, aspects, and advantages of the invention will become apparent from the description, the drawings, and the claims.

DETAILED DESCRIPTION

Figure 1:
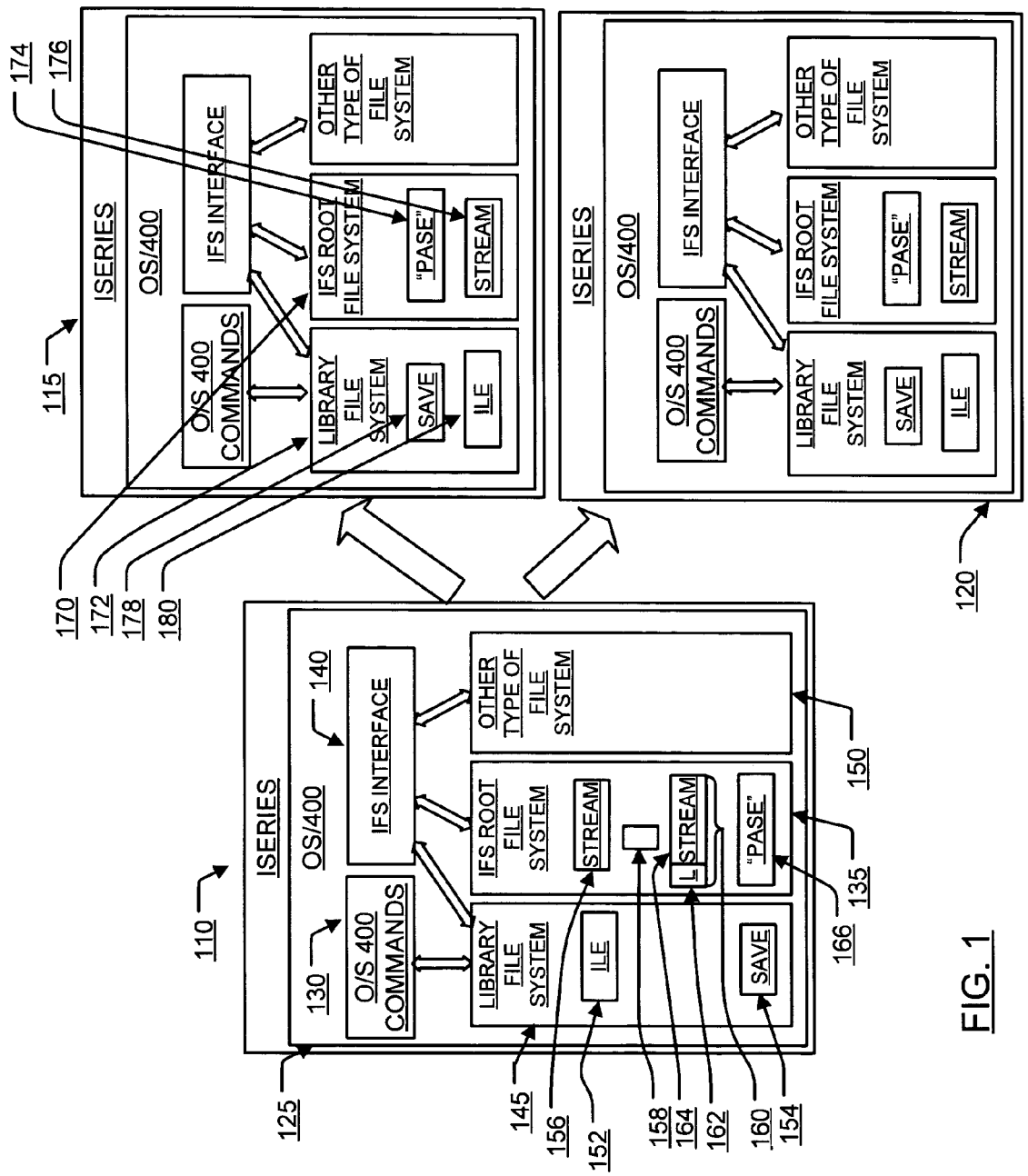
FIG. 1 shows an example computing system landscape that includes three iSeries server computing systems.

FIG. 1 shows an example computing system landscape that includes three iSeries server computing systems 110, 115, 120. As discussed above, iSeries computing systems are a series of computing systems offered by IBM. The iSeries typically runs IBM's proprietary operating system Operating System 400 ("OS/400") and can have IBM's IFS, which supports multiple file systems, such as the library file system and the IFS root file system. For example, a first computing system 110 includes a copy of the OS/400 (125) with a copy of the IFS including the IFS interface 140, which supports interaction with a library file system 145 and an IFS root file system 135. In addition, the first computing system 110 can support other file systems (150). In general, the IFS appears to a user as a superset file system that supports browsing of all file systems within an iSeries computing system and supports limited interaction among the file systems; however, the file systems that appear to be part of the IFS are not necessarily part of the IFS. For example, although the IFS root file system is part of the IFS, the library file system is not part of the IFS.

To support interaction among file systems, the IFS has an interface that can accept commands from users (e.g., a command-line command) or commands from programs, and can interface with the various file systems to fulfill commands. For example, the first computing system 110 has the IFS interface 140, which accepts computer application programming interface ("API") calls and can interact with the library file system 145 and the root file system 135 to transfer files among the file systems. In addition to the IFS interface 140, other interfaces can be used for interaction with the file systems. For example, OS/400 commands 130 support interaction with the library file system 145. Interaction among the file systems can include copying files across file systems. For example, in the first computing system 110, save files, such as the save file 154 stored in the library file system 145, can be saved to stream files, such as the stream file 156 in the root file system 135, with the command "CPYTOSTMF"; and stream files, such as the stream file 156 in the root file system 135, can be copied to a save file, such as the save file 154 in the library file system 145, with the command "CPYFRMSTMF."

The three iSeries computing systems 110, 115, 120 of FIG. 1 are similar. For example, they all include support for the IFS, each has a library file system, and each has a root file system. However, there can be differences among the iSeries computers. For example, the first computing system 110 can be an older version iSeries computing system than the other computing systems 115, 120. As another example, each of the computing systems can have different files systems supported by their respective IFS.

Data is generally stored in the library file system as objects, not files; whereas, other file systems supported by the IFS generally store files. To encompass both the concepts of objects of the library file system and files, such as stream files, of other IFS-supported file systems, the term file system object will be used throughout portions of the detailed description; however, the term "file system object" need not be limited to library file system objects and files of files of other file systems.

Transferring ILE Programs on the IBM iSeries

As discussed earlier, interaction among some of the files systems supported by the IFS can be limited. For example, an Integrated Language Environment ("ILE") program, such as the ILE program 152 in the library file system 145 of the first computing system 110, generally cannot be moved or copied to other file systems supported by the IFS, such as the IFS root file system 135; however, save files stored in the library file system can be copied to other file systems supported by the IFS. Because of this limitation and other limitations that restrict transfer of library file system objects across file systems, in some instances ILE programs and other types of library file system file system objects cannot, in general, be copied or moved across iSeries file systems or across different computing systems. For example, an ILE program generally cannot be copied from the first computing system 110 to a second computing system 115. Library file system objects have the property that, in general, they cannot be viewed, stored, or otherwise manipulated on non-iSeries platforms (e.g., Microsoft Windows NT). Thus, it can be disadvantageous to attempt to distribute library file system objects as distribution could be restricted among iSeries platforms (e.g., from a first library file system directly to a second library file system through a proprietary CD format that is limited to support of library file system objects), which can restricted the tools for distribution of software solutions that include library system objects. For example, if a distribution chain uses Microsoft Windows NT computing systems and tools for those systems to create distribution copies, library file system objects, in their native format, could not be distributed through that distribution chain—whereas, library file system objects that are converted to stream files could be distributed through such a distribution chain.

One technique for transferring ILE programs from the library file system of an iSeries computing system to another library file system of another computing system is as follows. An ILE program is saved to a save file in the library file system. The save file generated from the ILE program is transferred to the IFS file system by generating a stream file from the save file. Then, the stream file is copied to a compact disk, a tape, or other medium, and the compact disk, tape, or other medium is used to copy the stream file to another computing system. Other techniques can be used to transfer the stream file to another computing system. For example, the stream file can be transferred using a program that supports the file transfer protocol (FTP).

At the other computing system, the stream file is saved to the library file system on the other computing system as a save file. The save file is restored to the ILE program, and the ILE program can be run from the other computing system. Although this technique is used to transfer ILE programs among computing systems, it need not be limited to ILE programs, or limited to transferring file system objects to another computing system. Other types of library objects, other than ILE programs, can be transferred across the iSeries library file system or to other computing systems, or to other files systems that have limitations. For example, this technique can be used to store other types of library objects to a tape for backup and the library objects can later be copied back to a same computing system.

As an example of this technique, the ILE program 152 can be saved to the save file 154 in the library file system 145 of the first computing system. Then, the save file 154 of the first computing system can be copied to the stream file 156 and that stream file 156 can he copied to a compact disk for distribution to other computing systems, such as the second computing system 115. The stream file on the compact disk cm be copied to the second computing system 115 in its respective root file system 170 to a stream file 174. Then, that stream file 174 can be copied to the second computing system's library file system 172 as a save file 178. That save file 178 can be restored to an ILE program 180, which can then be run.

Self-Extracting ILE Executables for the IBM iSeries

Figure 2:
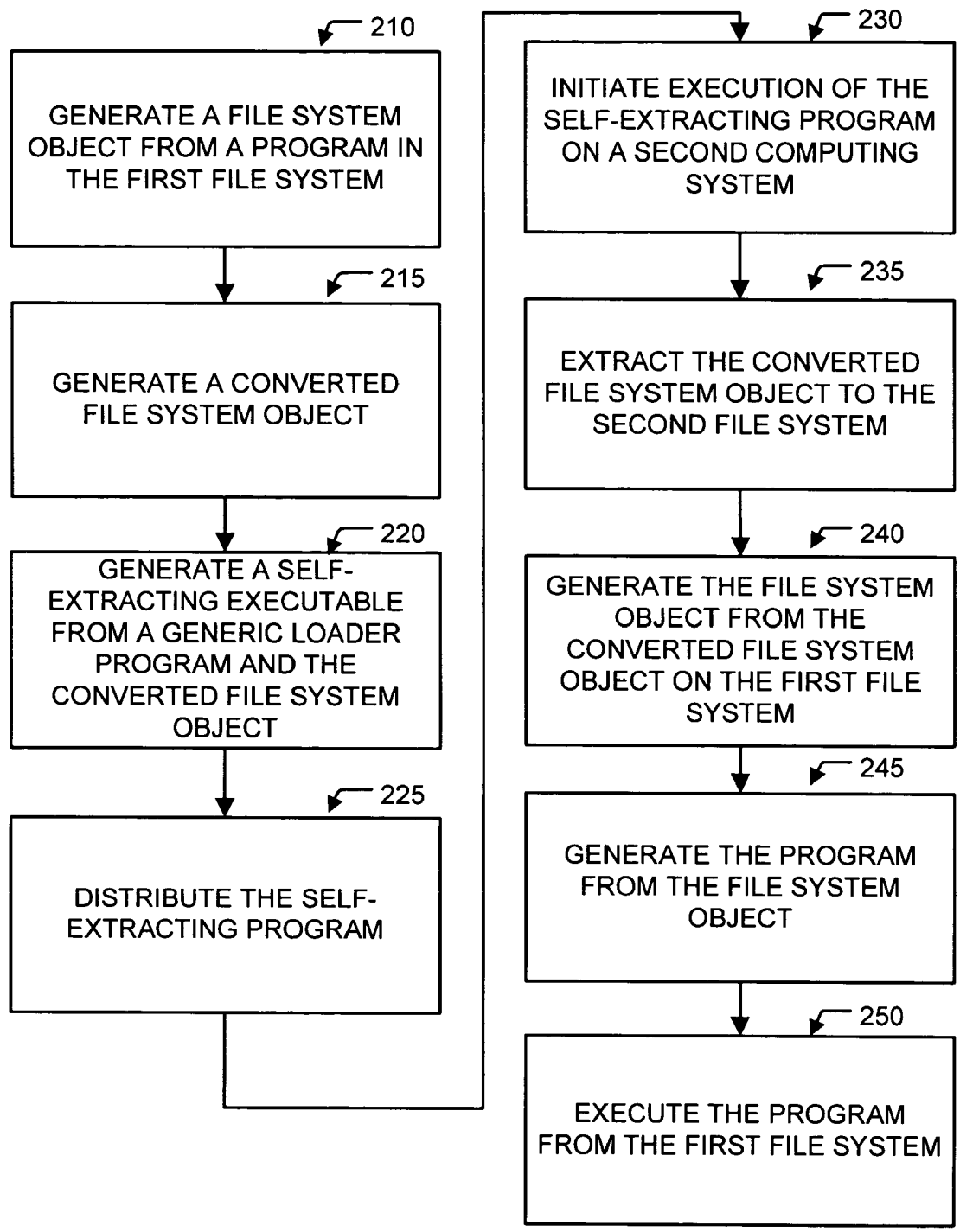
FIG. 2 is a flowchart illustrating an example process of transferring and executing a program on a computing system with multiple file systems.

As discussed above, limitations of the IFS generally inhibit the transfer of objects to or from the library file system. FIG. 2 is a flowchart illustrating an example process of transferring and executing a program on a computing system with multiple file systems. In the example process, one of the file systems offers limited support for file system objects from another file system. The example process will be discussed with reference to an example scenario involving transfer and execution of an ILE program on an iSeries computing system including the IFS to another library file system on another iSeries computing system. The example scenario will be discussed with reference to the computing systems of FIG. 1, although other computing systems can be used.

In the context of the example process, a first file system and a second file system support a first and second type of file system object, respectively. In the example scenario, the first computing system 110 includes the library file system 145, which supports ILE programs and save files, and the IFS root file system 135, which supports stream files. Support for the objects or files can include, as an example, support for storing the objects or files, respectively.

In the example process, a user or program causes a first computing system to generate a file system object from a program in the first file system (210). A file system object can be a file, a library object, or the like. The file system object should be in a format that can be transferred to the second file system (e.g., copied to or moved, such as by an operation that can generate a converted file system object at the second file system, where the object is converted to a file system object of the second type (e.g., can be used on the second file system)). Following the example scenario, a user causes the first computing system 110 to generate the save file 154 from the ILE program 152 in the library file system 145.

Next, in the example process, the first computing system generates a converted file system object in the second file system from the file system object (215). The file system object is converted from the first type of file system object that can be stored on the first file system to the second type of file system object that can be stored on the second file system. Following the example scenario, the stream file 156 is generated from the save file 154.

A linker program generates a self-extracting executable from a generic loader program and the converted file system object (220). The linker program can automatically combine the converted file system object and the generic loader program. Using the linker program can involve providing, to the linker program, a specification of a file to link to a loader program. The loader program is generic, at least, in the sense that the loader program is not designed to be linked with a specific file system object. The loader program can be made such that it can be easily configured for different payloads by changing parameters, where the parameters can be automatically generated and set by the linker program. The loader program is designed to be run from the second file system such that the loader program and its payload are interpreted to be a single program to be run from the second file system. Although the loader program is described as being generic, in some implementations the loader program need not be generic (e.g., can be specific for a particular file system object).

Continuing with the example scenario, a generic loader program 158 is combined with the stream file 156 to generate a combined package 160 that includes the loader program 162 and The stream file 164. In the example scenario, the loader program 158 is designed such that after being combined with a payload to generate the combined package 160, the root file system 135 (and other file systems supported by the IFS) interprets the combined package 160 as a single program that can be executed from the root file system 135. For example, the combined package 160 can be interpreted to be a PASE program (a program that can be executed from the root file system 135 from within the OS/400 125), such as the pseudo/PASE program 166, although only the loader program 162 portion of the combined package 160 is a PASE program.

The self-extracting program is distributed to one or more computing systems (225). Distributing the self-extracting program can involve distributing the program on a medium, such as compact disk or tape, or distributing through a network, such as distributing the program through an HTTP (hypertext transfer protocol) or FTP server. In the example scenario, the combined package 160, which comprises the self-extracting program and appears as a PASE program, is distributed on a compact disk to the second computing system 115.

Execution of the self-extracting program is initiated on a second computing system (230). Initiating execution can be automatic or manual. For example, a user can click on the program such that it causes the program to be executed, or loading of the program in a compact disk drive can cause execution of the program to be initiated automatically. In the example scenario, the PASE program 174 resides on a compact disk that is read as part of the root file system 170 and a user uses the interfaces of OS/400 to start the program. To both the user and OS/400 the self-extracting program appears as a PASE program (e.g., as an AIX binary executable program).

The second computing system extracts the converted file system object to the second file system (235). The converted file system object is extracted from the body of the self-extracting program. In the example scenario, the PASE program 174 extracts the stream file 176 to a temporary directory in the root file system 170. The loader program of the PASE program 174 causes the extraction of the payload in the PASE program 174.

The second computing system generates the file system object from the converted file system object on the first file system (240). Generating the file system object can involve copying the converted file system object and, as part of the process of copying the converted file system object, converting the file system object to the file system object that was generated at 210. In the example scenario, the loader program of the PASE program 174 causes the stream file 176 to be copied to the save file 178 of the library file system 172, which is similar to the library file system 145. The two libraries file systems are similar in, at least, the sense that objects from the first library file system 145 can be stored in the second library file system 172.

The program is generated from the file system object (245). The program that is generated can be the program that was used to generate the file system object. In some implementations, the program can vary. For example, if the program that was chosen for generating the file system object at the first computing system included different versions of language files, such as an English, Spanish, German, and French version of a language file, for the program, the program that is generated from the file system object can include only one version of the language files, such as the English version. In the example scenario, the ILE program 180 is generated at the library file system from the save file 178 and the ILE program 180 is the same as the ILE program 152.

The second computing system executes the program from the first file system (250). The program can be called from the self-extracting program. For example, the ILE program 180 is called from the PASE program 174 such that execution of the ILE program 180 starts from the library file system 172.

The processes of 235, 240, 245, and 250 can be performed by the generic loader program without user interaction. Advantageously, a user need not be familiar with the technologies of a computing system with multiple file systems. When the processes of 235, 240, 245, and 250 are being performed a user need not know of a transition between file systems or between the execution of the self-extracting program and the program that was generated at 245. The process can appear to a user as if a single program is being executed; thus, simplifying the user's experience.

Although not shown as part of the example process, should a user chose to execute the program again, the user can initiate execution of the self-extracting program and the self-extract program can check to see if the program already exists on the first file system of the second computing system. If the program already exists, the self-extracting program can causes the program to be run from the first file system. Advantageously, the self-extracting program need not extract the converted file system object, cause the file system object to be generated at the first file system, and cause the program to be generated from the file system object at the first file system, thus reducing overhead.

Although the example process of FIG. 2 was discussed with reference to an example scenario and FIG. 1, the use of the example process is not necessarily limited to transfer and execution of ILE programs on an iSeries computing system, or to the example computing systems of FIG. 1.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims.

What is claimed is:

1. A loader, tangibly embodied in a computer readable storage medium, configured to perform tasks comprising:
    extracting a first one or more file system objects from a self-extracting program stored on a second file system as a Portable Application Solutions Environment (PASE) formatted program, the self-extracting program including a second file system object and a generic loader program, the first file system object being generated from a program in a first file system, the program being formatted to be incapable of being transferred to the second filing system, and the first file system object being formatted to be capable of being transferred to the second filing system, the first filing system object comprising the second file system object converted from a first type of file system objects of a first file system stored on the first file system to a second type of file system objects of a second file system stored on the second file system, such that the second file system is operative to store file system objects of the second type and inoperative to store files of the first type; and
    converting the first file system objects to a third one or more file system objects in the first file system, such that
    the second file system object comprises a stream file generated from an Integrated Language Environment executable program that had been compressed into a save file in a library file system and copied into a stream file on the second file system;
    the second file system object further comprises a generic loader program operative to run front the second file system; the first file system is the library file system; and
    the second file system is an iSeries Integrated File System file system that is operative to store stream files.

2. The loader of claim 1, wherein a first program comprises the second and third one or more file system objects and the loader is further configured to perform tasks comprising:
    initiating execution of the first program, the first program executing from the first file system.

3. The loader of claim 1, wherein a first program comprises the third one or more file system objects, and converting the first file system objects comprises:
    generating one or more compressed files on the first file system from the first file system objects; and
    generating the third one or more objects from the compressed files.

4. A computer program product, tangibly embodied in a computer-readable storage medium, the computer program product being operable to cause data processing apparatus to:
    extract a first file system object from a self-extracting program stored on a second file system as a Portable Application Solutions Environment (PASE) formatted program, the self-extracting program including a second file system object and a generic loader program, the first file system object being generated from a program in a first file system, the program being formatted to be incapable of being transferred to the second filing system, and the first file system object being formatted to be capable of being transferred to the second filing system, the first filing system object comprising the second file system object converted from a first type of file system objects of a first file system stored on the first file system to a second type of file system objects of a second file system stored on the second file system, such that the second file system is operative to store file system objects of the second type and inoperative to store file system objects of the first type; and convert the first file system objects to a third one or more file system objects in the first file system, such that:

the second file system object comprises a stream file generated from an Integrated Language Environment executable program that had been compressed into a save file in a library file system and copied into a stream file on the second file system;

the second file system object further comprises the generic loader program operative to run from the second file system; the first file system is the library file system; and the second file system is an iSeries Integrated File System file system that is operative to store stream files.

5. The computer program product of claim 4, wherein a first program comprises the second and third one or more file system objects and the computer program product is further operable to cause the data processing apparatus to:

initiate execution of the first program, the first program executing from the first file system.

6. The computer program product of claim 4, wherein a first program comprises the third one or more file system objects, and converting the first file system objects comprises:

generating one or more compressed files on the first file system from the converted file system object; and generating the third one or more objects from the compressed files.

7. A method comprising:

generating a first file system object from a program in a first file system, the program being formatted to be incapable of being transferred to a second file system, and the first file system object being formatted to be capable of being transferred to the second file system;

converting the first file system object of a first type stored on the first file system into a second file system object of a second type stored on the second file system;

generating a self-extracting program operable to automatically run from the second file system and stored on the second file system as a Portable Application Solutions Environment (PASE) formatted program, such that the second file system is operable to store file system objects of the second type but is inoperable to store file system objects of the first type, the self-extracting program including the second file system object and a generic loader program;

extracting the second file system object from the self-extracting program;

converting the extracted second file system object into a third file system object of the first type; and storing the third file system object in a first file system, such that the first file system is operable to store file system objects of the first type;

generating the program from the third file system object, such that:

the second file system object comprises a stream file generated from an Integrated Language Environment (ILE) executable program that had been compressed into a save file in a library file system and copied into a stream file on the second file system, the second file system object further comprises the generic loader program operative to run from the second file system, the first file system is the library file system, and the second file system is an iSeries Integrated File System file system that is operative to store stream files.

8. The method of claim 7 further comprising:

executing the self-extracting program from the second file system to generate the third file system object in the first file system.

9. The method of claim 8, wherein:

the self-extracting program is generated on a first computing system;

each of the first computing system and a second computing System comprise the first and second file systems; and the method further comprises the self-extracting program executing on the second computing system.

10. The method of claim 7, wherein a first program comprises the first and third file system objects and the self-extracting program is further operative to cause the first program to execute.

11. The method of claim 7, wherein the first file system object comprise a compressed program.

12. The method of claim 7, wherein the second file system is an iSeries Integrated File System root file system.

13. The method of claim 7 wherein:

the file system object of the first type comprises an ILE program object, the file system object of the second type comprises an IFS stream file, and the method further comprises generating a save file from an ILE program file and generating the second file system object from the save file, the second file system object being a stream file.

14. The method of claim 7, wherein generating a self-extracting program comprises:

linking the second file system object with a loader program to generate the self-extracting program, wherein the loader program is operative to run from the second file system.

15. The method of claim 14, wherein the loader program is a generic loader program and generating tile self-extracting program further comprises setting parameters of the generic loader program.

16. The method of claim 7, wherein the first file system object comprises a same program as the third file system object.

17. The method of claim 7, wherein file system objects of the first comprise library file system objects and file system objects of the second type comprise IFS root file system files.

18. The method of claim 7, wherein the program comprises the ILE executable program, and wherein the first and third file system objects comprise the save file in the library file system.

* * * * *